United States Patent [19]

St. Pierre et al.

[11] Patent Number: 4,948,311
[45] Date of Patent: * Aug. 14, 1990

[54] TIE DOWN FITTING

[76] Inventors: Frank H. St. Pierre, 27732 W. Moonridge La., Castaic, Calif. 91310; Jack D. Jensen, P.O. Box 7895, Newport Beach, Calif. 92658

[*] Notice: The portion of the term of this patent subsequent to Aug. 9, 2005 has been disclaimed.

[21] Appl. No.: 226,838

[22] Filed: Aug. 1, 1988

Related U.S. Application Data

[63] Continuation-in-part of Ser. No. 73,005, Jul. 13, 1987, Pat. No. 4,762,449.

[51] Int. Cl.[5] .................. B60P 7/06; F16B 21/00
[52] U.S. Cl. ...................... 410/107; 410/110; 410/116; 296/43; 296/167; 248/499; 248/503
[58] Field of Search ............ 410/101, 106–113, 410/116; 296/43, 167; 248/293, 499, 500, 503, 503.1; 294/89

[56] References Cited

U.S. PATENT DOCUMENTS

| | | | |
|---|---|---|---|
| 61,590 | 1/1867 | Whitmarsh et al. | 248/294 |
| 1,136,286 | 4/1915 | Stafford | 248/290 |
| 2,134,823 | 11/1938 | Herrmann et al. | 248/361 |
| 2,372,803 | 4/1945 | Turner | 248/503.1 |
| 3,082,990 | 3/1963 | Nelson | 248/308 |
| 3,102,708 | 9/1963 | Crain | 410/107 |
| 3,142,264 | 7/1964 | Boer | 410/106 |
| 3,223,375 | 12/1965 | Bernasconi | 248/361 |
| 3,289,989 | 12/1966 | Ferenz | 248/205 |
| 3,351,356 | 11/1967 | Clark et al. | 410/116 |
| 3,357,670 | 12/1967 | Larson | 248/361 |
| 3,381,925 | 5/1968 | Higuchi | 410/116 |
| 3,385,547 | 5/1968 | West | 248/205 |
| 3,402,961 | 9/1968 | Larson | 296/23 |
| 3,414,226 | 12/1968 | Patnaude | 248/499 |
| 3,421,726 | 1/1969 | Getter | 296/434 X |
| 3,556,457 | 1/1971 | Patnaude | 248/499 |
| 3,718,946 | 3/1973 | Lungsford et al. | 24/73 |
| 3,779,502 | 12/1973 | Marberg | 410/116 |
| 3,782,775 | 1/1974 | Weiler et al. | 296/23 |
| 3,941,250 | 3/1976 | Ott | 248/294 |
| 3,955,847 | 5/1976 | Schiowitz | 248/505 X |
| 3,966,250 | 6/1976 | Winskas | 296/1 |
| 4,295,765 | 10/1981 | Burke | 410/101 |
| 4,531,774 | 7/1985 | Whatley | 410/101 |
| 4,607,991 | 8/1986 | Porter | 410/110 |
| 4,615,554 | 10/1986 | Schilla et al. | 294/89 |
| 4,657,299 | 4/1987 | Mahan | 296/43 |

Primary Examiner—Margaret A. Focarino
Assistant Examiner—Dean J. Kramer

[57] ABSTRACT

A tie down assembly including a fitting adapted to fit within a stake hole in a wall section of a pickup truck. The lower plate is dimensioned and configured for insertion through the stake hole for engagement with the underside of the wall section. An upper plate of the fitting engages the upper side of the section and is secured to the lower plate by a fastener assembly. In one embodiment aligned slots in the plates receive a retainer member for pivotal movement between a recessed position flush with the wall section to a projected position where it is adapted for engagement by a cargo securing line or the like. In another embodiment the fastener assembly projects above the truck bed side walls for engagement by securing or clamping elements. A number of such fittings enable securement of cargo on the truck bed or, in conjunction with a clamping assembly, the securement of a camper top or the like onto the truck side walls.

10 Claims, 3 Drawing Sheets

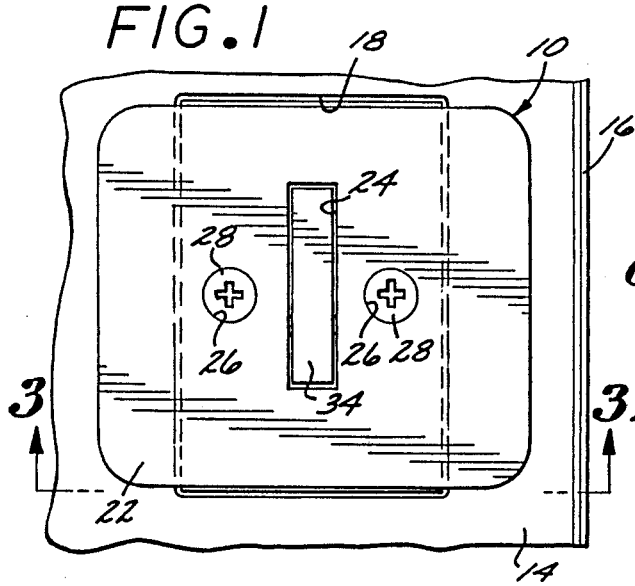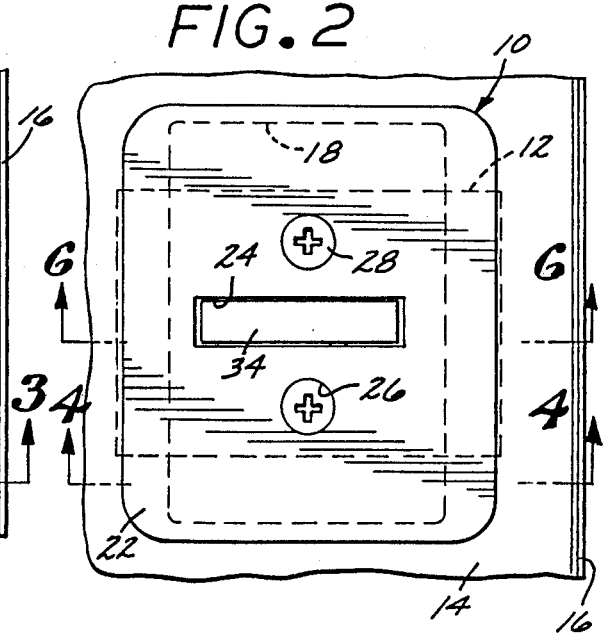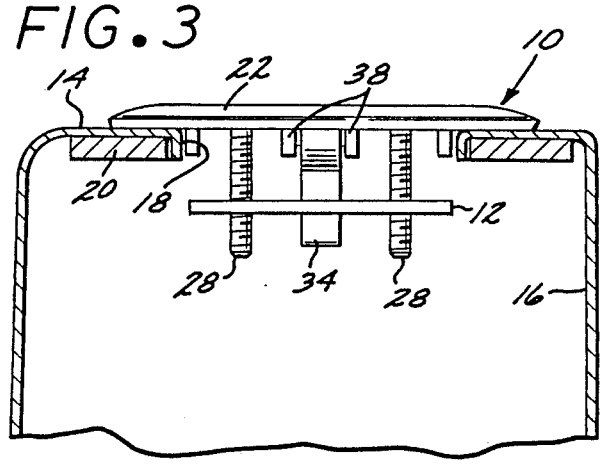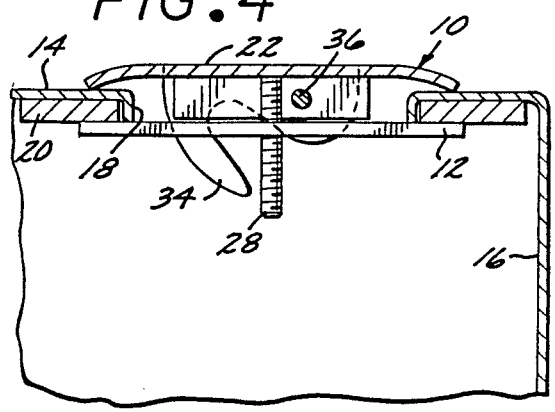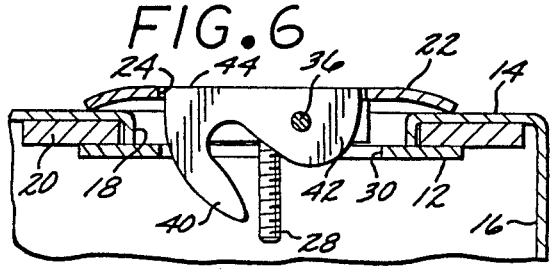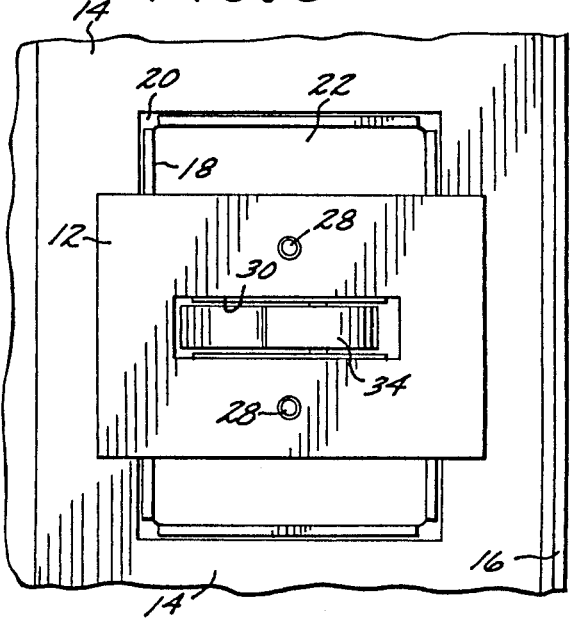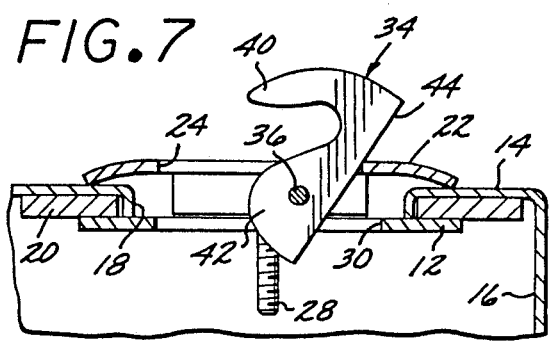

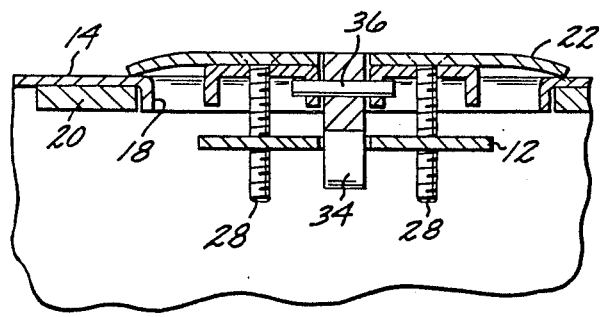
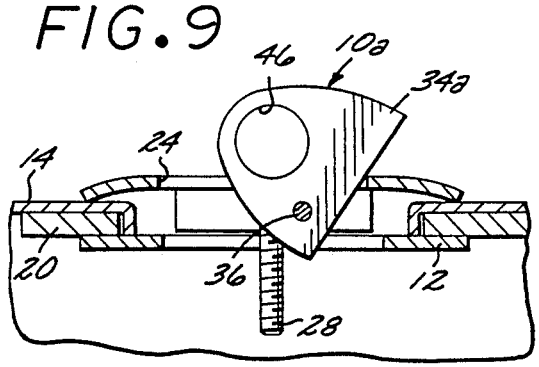
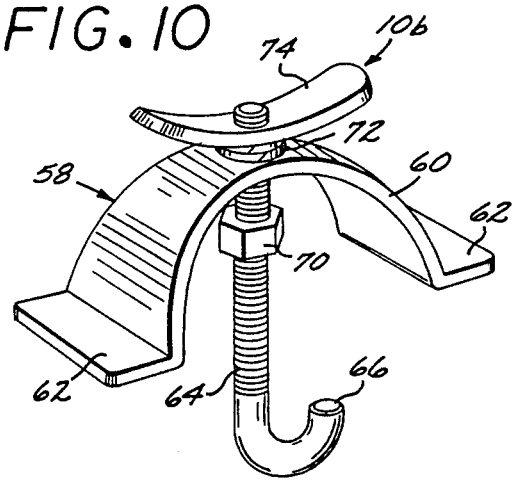
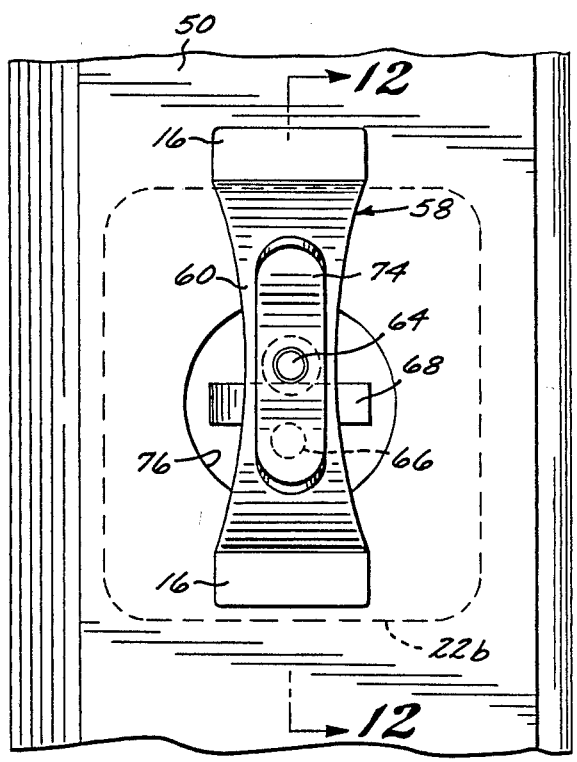
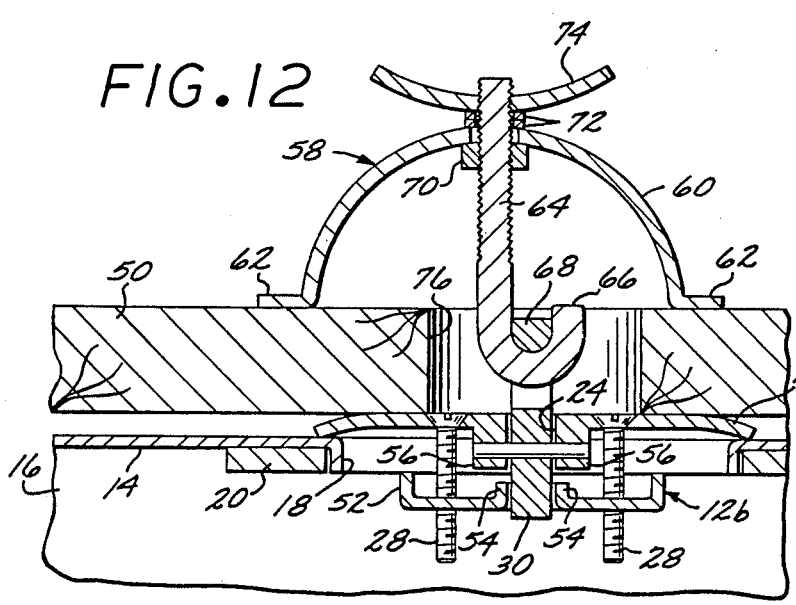
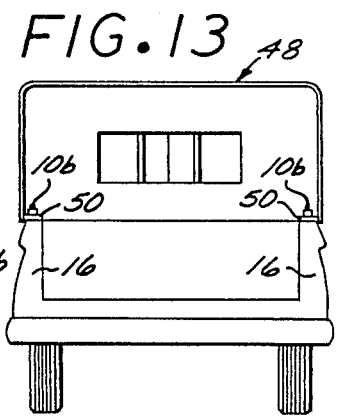

TIE DOWN FITTING

CROSS REFERENCE TO RELATED APPLICATION

This application is a continuation-in-part of our co-pending parent patent application Ser. No. 07/073,005, filed July 13, 1987 now U.S. Pat. No. 4,762,449. The present application discloses further embodiments, and particularly embodiments which facilitate use of the tie down assembly to secure structures such as truck camper bodies.

BACKGROUND OF THE INVENTION

1. Field of the Invention

The present invention relates to a tie down assembly and more particularly to a tie down assembly having a fitting for removable mounting within a stake hole of a pickup truck to aid in securing truck bed cargo or a camper top.

2. Description of the Prior Art

It is common to use tie downs to secure cargo in the bed of a pickup truck. The tie downs are fixed around the perimeter of the truck bed and provide anchorages for cargo securing lines.

The usual tie down is in the form of an eye cleat or hook fastened to the truck bed side wall by screws or the like which extend through openings specially drilled in the side wall. Tie downs of this type are illustrated in U.S. Pat. Nos. 3,223,375 (J. E. Bernascone, issued Dec. 14, 1965); 3,357,670 (C. 0. Larson, issued Dec. 12, 1967); and 4,295,765 (Burke, issued Oct. 20, 1981). Proper location of the drilled openings is tedious and time consuming. Further, if bolts are used rather than screws, access to both sides of the side wall section is required.

It is impractical for a truck owner to remove such tie downs for use on another truck because of the semipermanent nature of the installation and because of the unsightly fastener openings which remain.

There is a need for a tie down assembly which can be quickly and removably fitted to a pickup truck side wall without any need for drilling or cutting of the wall. In certain applications it is preferable that the fitting be retractable to a flush relationship with its mounting surface so that it is unobtrusive and out of the way when not in use. However, it should be easily movable to a position for engagement by a cargo securing line.

There is also a need for a tie down assembly of the foregoing character, but which also includes a securing or clamping assembly which is engagable with the frame of a camper top or analogous structure for securing the camper top in position upon the pickup truck side walls.

SUMMARY OF THE INVENTION

According to the present invention, a tie down assembly is provided which includes a fitting having a lower plate adapted to be received within the standard post or stake hole found in many current models of pickup truck. Using the existing stake hole eliminates any need for specially drilled fastener openings in the truck side wall.

The lower plate is dimensioned for manipulation downwardly through the stake hole and into the inside of the side wall so that positioning of the lower plate from the inside of the side wall is not required. An upper plate is provided for engagement with the upper side of the side wall, and one or more fasteners extend between the plates to firmly secure them in position.

In one embodiment a hook or eye member which is carried within slots provided in the plates is pivotable from a recessed position flush with the cover plate to a projected position for engagement by a cargo securing line or the like. Simply pressing the hook or eye member in its recessed position pivots it upwardly for use. Its center of gravity tends to maintain it in either a recessed or projected position, depending upon its location. In this version the tie down assembly constitutes an inexpensive means for quickly providing a cargo securing line anchorage. There is no need for the cutting or drilling of special fastener holes in the truck side wall, and the fitting assembly can be easily removed at any time for remounting on another truck if desired. When not in use the flush mounted assembly is aesthetically attractive and does not interfere with other uses of the truck.

In another embodiment of the tie down assembly the assembly includes a securing or clamping means particularly adapted to attach a camper top or similar structure to the truck side walls. One version of the clamping means includes an arcuate bridge or support adapted to rest upon the peripheral frame of a camper top in general alignment with an opening in the frame. A threaded J-bolt having a hook-like lower extremity is mounted to the support. The lower extremity is adapted to be disposed through the hook or eye of the fitting carried by the camper side walls, and the upper extremity of the J-bolt mounts a wing nut which is rotatable to press the arcuate support down upon the camper top frame by pulling upwardly upon the hook or eye member of the fitting mounted to the truck side wall. A plurality of such tie down assemblies can be used to quickly and detachably secure a camper top in position. Removal of the camper top allows the remaining fitting of the tie down assembly to be used for tying down cargo in the truck bed.

A variation of the foregoing tie down assembly is characterized by a fitting having a threaded upwardly projecting stud adapted to extend through the opening in the camper top frame. An eye member threaded onto the stud secures the camper top in position and also provides an opening or eye for accepting securing lines to secure cargo items located within the camper top.

Other objects and features of the invention will become apparent from consideration of the following description taken in connection with the accompanying drawings.

BRIEF DESCRIPTION OF THE DRAWINGS

FIG. 1 is a partial top plan view of a horizontal section of a truck bed side wall, showing the side wall fitting of the present tie down assembly in a preliminary installation position, after maneuvering of the clamping or lower plate through the side wall stake opening and into the side wall interior;

FIG. 2 is a view similar to FIG. 1, but illustrating the fitting rotated 90 degrees into its final installation position;

FIG. 3 is a view taken along the line 3—3 of FIG. 1;

FIG. 4 is a view taken along the line 4—4 of FIG. 2;

FIG. 5 is a bottom plan view of the structure of FIG. 2;

FIG. 6 is a view taken along the line 6—6 of FIG. 3, illustrating the hook member in its recessed position;

FIG. 7 is a view similar to FIG. 6, but illustrating the retainer or hook member in its projected position;

FIG. 8 is a view taken along the line 8—8 of FIG. 6;

FIG. 9 is a view similar to FIG. 7, but illustrating a retainer member having an opening or eye instead of the hook configuration of the embodiment of FIG. 7;

FIG. 10 is a perspective view of a tie down assembly which includes a securing or clamping assembly for securing a camper top in position upon the truck side walls;

FIG. 11 is a top plan view of the clamping assembly of FIG. 10 in mounted position upon a camper top frame which is illustrated in position above a truck side wall;

FIG. 12 is a view taken along the line 12—12 of FIG. 11;

FIG. 13 is an end elevational view schematically illustrating the camper top held in position by a plurality of the tie down assemblies;

DESCRIPTION OF THE PREFERRED EMBODIMENT

Figure 14:
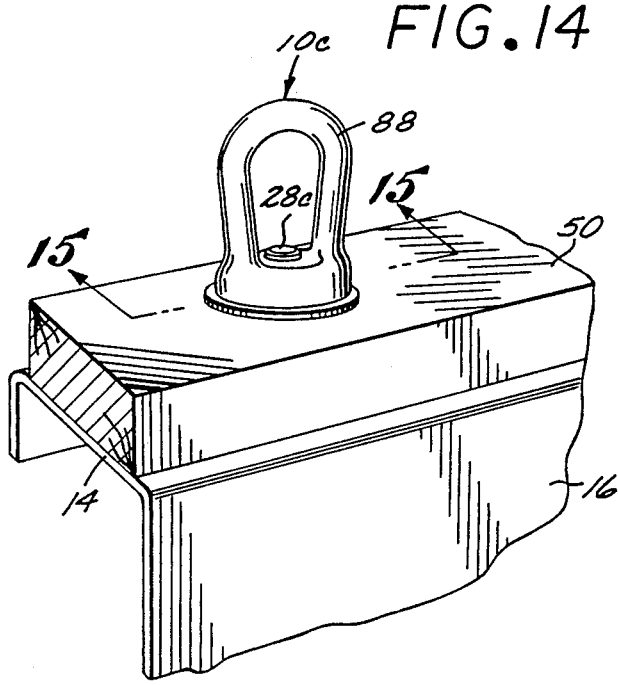
FIG. 14 is a perspective view of yet another embodiment of the present tie down assembly, illustrated in association with a camper top frame.

Referring now to the drawings, there is illustrated a tie down means or assembly 10 according to the present invention which comprises, generally, a flat, rectangular clamping lower plate 12 adapted to engage the underside of a horizontal section 14 of a hollow sheet metal side wall 16 of a pickup truck (not shown).

The section 14 includes a plurality of rectangular post or stake holes, one of which is illustrated at 18. These are punched or otherwise formed through the material of the section. In some pickup trucks the edge margins of the holes are reversely formed to provide a reinforcing bead, but in the side wall structure illustrated the four edge margins of each hole are downwardly deformed to provide flanges. As best seen in FIG. 5, a rectangular reinforcing frame 20 is fitted against these flanges and is welded in position.

In the description which follows, the term "underside" denotes the inner or underside of the wall section 14, whether it is constituted only of the sheet metal material of the truck side wall, or of such sheet metal plus the reinforcing frame 20.

It is important that the lower plate 12 be dimensioned so that it can be easily manipulated or maneuvered through the stake hole 18 for engagement with the underside of the section 14. This eliminates any need for access to the inside of the hollow side wall to install the assembly 10.

Since the typical stake hole 18 is rectangular, the plate 12 is easily insertable if it is made rectangular and one lateral dimension, either its width or its length, is made slightly smaller than the rectangular hole 18. Once the plate is passed through the hole, the version of FIG. 1 can be rotated sideways or 90 degrees, with its long dimension disposed across the short dimension of the hole 18. Of course, other options are possible, such as making both dimensions of the plate 12 less than the corresponding dimensions of the hole 18, and tipping the plate 12 to fit it within the hole 18, or orienting the plate to fit diagonally through the hole. The main object is to make the relative dimensions of the plate and hole so that the plate can be fitted through the hole from the outside. As will be seen, this is facilitated when the plate is supported by other parts of the tie down assembly during initial installation.

The assembly 10 further comprises a rectangular cover or upper plate 22 having lateral dimensions slightly larger than the corresponding dimensions of the hole 18 so that in its installed position it is capable of covering the hole and engaging the upper side of the section 14 adjacent the hole margins, in the manner of an escutcheon plate.

The edges of the plate 22 are preferably downwardly rounded or curvilinear to allow objects such as ropes to slide over the plate without entanglement, and also to present an aesthetically pleasing shape. The corners of the plate are rounded for the same reasons.

The upper plate 22 includes a centrally located, elongated slot 24 and a pair of openings 26 on opposite sides of the slot. A pair of fasteners or machine screws 28 comprise a fastener assembly carried by the plate 22. The flat heads of the screws fit within countersunk portions of the openings 26 so that the screw heads are flush with the outer surface of the plate. The threaded shanks of the screws preferably are significantly smaller than the openings 26 so that the screws are loosely carried and can tip or waggle relative to the plate. As will be seen, this facilitates installation of the assembly 10.

The lower plate 12 also includes a central elongated slot 30 and openings on opposite sides of the slot. The slot 30 and the openings are vertically aligned with the slot 24 and openings 26 in the upper plate 22.

The openings in the plate 12 are threaded to threadably receive the machine screws 28, as seen in FIG. 3, so that the plates 12 and 22 can be tightly urged against the under side and upper side, respectively, of the wall section 14 on tightening of the screws, as seen in FIG. 4.

A retainer means in the form of a hook member 34 is disposed within the slots 24 and 30. It is carried by a transverse pivot pin 36 which carries the hook member 34. The pin 36 is pivotally supported at its opposite ends by a pair of channels 38 which depend from and which form an integral part of the cover plate 22. The channels 38 are spaced apart to form a continuation of the cover slot 24.

The hook member 34 includes a hook portion 40 and a body portion 42 through which the pin 36 extends. The body portion is characterized by a flat surface 44 on one edge and a curvilinear surface on the opposite edge. The curvilinear surface merges with an adjacent curvilinear surface of the hook portion 40 to define a hooking surface adapted for engagement by a cargo securing line or the like (not shown).

The hook member is pivotable about the axis of the pin 36 between the recessed position of FIG. 6 and the projected position of FIG. 7. In the recessed position the flat surface 44 is flush with the upper surface of the cover plate 22. In the projected position the flat surface 44 is engaged upon one end margin of the cover slot 24. This engagement prevents further outward pivotal movement of the hook member and acts as a stop to take the strain of any securing line engaged upon the hook portion 40.

To install the assembly 10 a user first assembles the components with the screws 28 threaded out of the plate 12 somewhat to allow easy insertion of the plate 12 within the stake hole 18, as seen in FIGS. 1 and 3. In this particular embodiment the fitting is next rotated to the position of FIGS. 2 and 4, and the screws 28 are tightened to complete the installation.

The retracted hook member 34 can be pivoted from the recessed position of FIG. 7 by pressing on the flat surface 44 on the side of the pivot pin axis opposite the hook portion 40. The partially projected hook portion 40 can then be grasped and pivoted to the position of FIG. 7. The center of gravity of the hook member 34 is such that it tends to maintain the member 34 in its projected position, in readiness for use as a securing line anchorage.

The tie down assembly 10 is thus quickly mountable to a pickup truck side wall without having to drill any special openings. Conversely, it is quickly demountable for transfer to another vehicle, if desired.

The retraction capability of the fitting makes it aesthetically attractive and removes any potential for snagging of foreign objects when it is not in use.

Referring now to FIG. 9, the tie down assembly illustrated is identical to the tie down assembly of FIGS. 1–8 in most respects. Corresponding numerals are utilized to denote substantially identical components, with the subscript "a" being utilized for certain components which are similar in function but not identical. This same notation will be followed in conjunction with the description which follows respecting other embodiments of the tie down assembly.

The tie down assembly 10a of FIG. 9 is identical to the tie down assembly 10 except for the use of a retainer means in the form of an apertured or eye member 34a. The member 34a operates in a manner identical to that of the hook member 34, except that the opening or eye 46 is adapted to receive a cargo line or the like in a manner that entraps the cargo line so that it can be removed only along the axis of the line and not laterally, as in the case of the hook member 34.

Referring now to FIGS. 10–13, a tie down assembly 10b is illustrated which is constructed to withstand heavier loads. It further includes additional components for mounting overlying structure such as the camper top 48 illustrated in FIG. 13. The camper top is typical and includes an upper or cover portion having depending sides which are attached to a horizontally oriented frame 50. The frame 50 is usually made of wood and is dimensioned and configured to rest on top of the side walls 16 of the camper truck.

The fitting assembly of the tie down assembly 10b shown detachably mounted to the truck side walls is substantially identical to that of the first embodiment of FIGS. 1–8. However, in the embodiment of FIGS. 10–13 the lower plate 12b is not flat. Instead, it is characterized by a perimetrical, upwardly extending flange 52, and also upwardly extending flanges 54 adjacent the central slot 30. The flanges 52 and 54 stiffen the lower plate 12b against bending so that the plate is adapted to carry the heavier loads occasioned when the fitting assembly is coupled to a camper top.

Likewise, the upper plate 22b includes heavier trunnion sections 56 adjacent the slot 24 to provide an increased cross section to carry the pin 36, so that the pin and trunnions can carry heavier loads.

In order to secure the camper top 48 in position the tie down assembly 10b includes a securing or clamping assembly 58. As best seen in FIG. 10, the assembly 58 comprises an arcuate bridge portion or support 60 which is downwardly concave, terminating in a pair of lateral, horizontally oriented flanges or sections 62 adapted to rest upon the top of the camper top frame 50, as seen in FIG. 12.

The support 60 includes a central aperture to accept the threaded shank of a J-bolt 64. The lower extremity of the bolt 64 is formed into a hook portion 66 which is disposed through the eye of a retainer 68 identical to the retainer or eye member 34a of the embodiment of FIG. 9. Of course, a plurality of retainers 68 and their associated components are distributed around the periphery of the camper bed for complemental association with a corresponding number of clamping assemblies 58 distributed around the camper top frame 50.

A lock nut 70 is threaded onto the upper extremity of the threaded shank of the J-bolt 64 to bear against the underside of the support 60, as will be seen. A pair of washers 72 engage the upper side of the support 60 and facilitate rotation of a fastener element or wing nut 74 which is threaded onto the upper end of the J-bolt 64.

Installation of each tie down assembly 10b begins with mounting of its plates 12b and 22b in fixed position upon the associated truck side wall 16. The frame 50 is provided with complementally spaced apertures or holes 76 for alignment with the retainers 68. The frame is then lowered into the truck side walls. Next, each hook portion 66 is passed through the associated frame opening and hooked into the eye of the retainer 68. The wing nut 74 is then tightened to tightly urge and seat the clamping assembly 58 against the frame 50. Once the frame 50 is securely clamped in position, a wrench or the like is inserted laterally within each support 60 in order to tighten each lock nut 70 to prevent inadvertent loosening of the wing nuts 74.

Referring now to FIGS. 14–17, a tie down assembly 10c is illustrated which is similar in function to the tie down assembly 10b just described, except that the camper top clamping assembly portion is characterized by an opening or eye to accept a cargo line or the like. The clamping assembly is generally identified at 58c and is associated with a modified form of side wall fitting assembly.

More particularly, the side wall fitting assembly comprises a clamping or lower plate 12c having a central aperture for threadably accepting a fastening assembly in the form of a single threaded stud 28c. It also comprises and upper plate 22c in the form of a flat section which is upwardly concave. It is characterized at its ends by downturned, centrally located abutment sections 78, and a pair of laterally directed, horizontally oriented end flanges 80 adjacent each abutment section 78.

Figure 15:
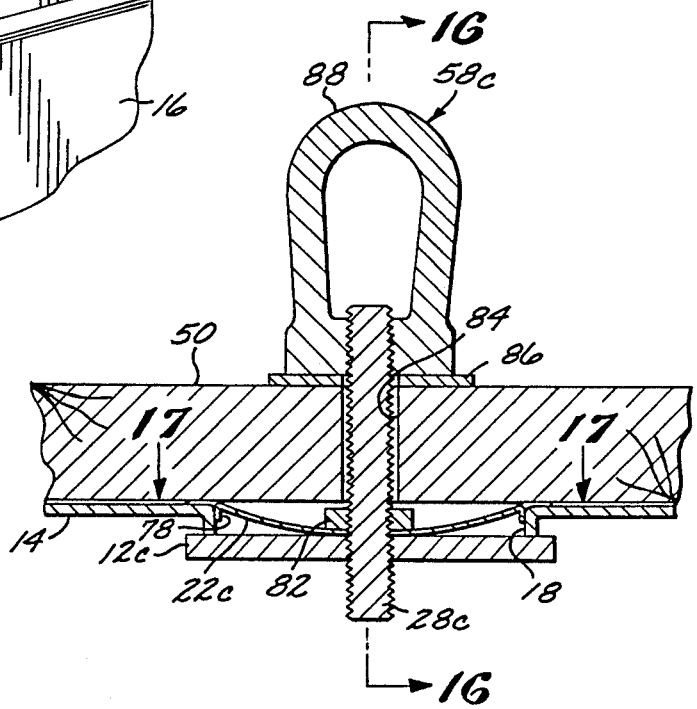
FIG. 15 is an enlarged view taken along the line 15—15 of FIG. 14.
Figure 16:
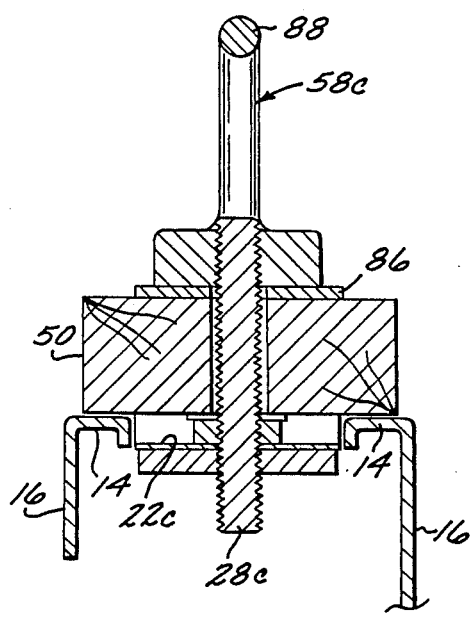
FIG. 16 is a view taken along the line 16—16 of FIG. 15.
Figure 17:
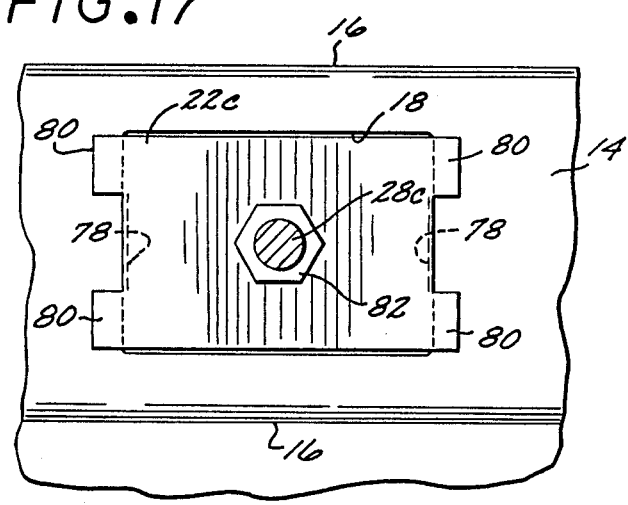
FIG. 17 is a view taken along the line 17—17 of FIG. 15.

As best seen in FIGS. 15 and 17, the abutment sections 78 engage opposite margins of the stake hole 18, and the end flanges 80 rest upon the upper surfaces of such margins. The length of the upper plate in the area of the end flanges 80 is slightly longer than the length of the stake hole 18, as seen in FIG. 17.

The width of both plates 12c and 22c is slightly less than the width of the stake hole 18 to enable them to be easily fitted to the stake hole 18. In this regard, as seen in FIG. 15, the length of the lower plate 12c is longer than the length of the stake hole 18 so that the plate 12c will bear against the margins defining the stake hole 18. Installation of the lower plate 12c, as in previous embodiments, is simply a matter of tipping or tilting the plate until it is disposed through the stake hole, and thereafter orienting it horizontally, as will be evident.

The upper plate 22c has a central opening for accommodating the threaded stud 28c, and a lock nut 82 is tightened on the stud to secure the upper and lower plates in position adjacent the stake hole 18.

The camper top frame 50 is next lowered onto the truck side walls, with openings 84 in the frame 50 aligned with the upwardly project studs 28c. A washer 86 is disposed over each stud 28c, and the complementally threaded base of an eye member or clamp 88 is threaded onto the upper end of the stud 28c. Tightening of the clamp 88 urges the central portion of the bowed upper plate 22c upwardly, forcibly urging the abutment sections 78 against the margins of the stake hole 18, and also firmly clamping the frame 50 against the horizontal sections 14 of the truck side walls.

The central opening or eye of the clamp 88 is adapted to accept cargo lines or the like (not shown) in a manner similar to the function of the hook member 34 or eye member 34a of the embodiments of FIGS. 1–8 and FIG. 9, respectively.

The tie down assemblies of FIGS. 10–12 and 14–17 provide a very convenient way to quickly mount a camper top in position on a pickup truck, and with tie down assemblies which are easily removable for use with other pickup trucks, as need.

Various modifications and changes may be made with regard to the foregoing detailed description without departing from the spirit of the invention.

We claim:

1. A tie down assembly for mounting to a vehicle cargo bed side wall having a horizontal section provided with a stake hole, the assembly comprising:
    a lower plate means having an opening and dimensioned for passage through the stake hole and manipulation into engagement with the underside of the side wall section;
    upper plate means for engagement with the upper side of the section and including an opening aligned with the opening in the lower plate means;
    retainer means aligned with the openings in the upper and lower plate means for projection above the upper side of the upper plate means, and carried by the upper plate means for pivotal movement into the openings in the upper and lower plate means in a recessed position relative to the upper plate means; and
    fastener means engaged upon the upper plate means for threadably engaging the lower plate means whereby the upper and lower plate means are tightly urged against the section upper side and underside, respectively.

2. A tie down assembly according to claim 1 wherein the retainer means comprises an eye member pivotable about an axis lying between the opposite extremities of the eye member whereby the eye member can be pivoted upwardly from the recessed position by pressing upon one extremity of the eye member.

3. A tie down assembly for mounting to a vehicle cargo bed side wall having a horizontal section provided with a stake hole, the assembly comprising:
    a lower plate means having an opening and dimensioned for passage through the stake hole and manipulation into engagement with the underside of the side wall section;
    upper plate means for engagement with the upper side of the section and including an opening aligned with the opening in the lower plate means, the upper plate means including end abutments adapted to bear against opposite margins of the stake hole, respectively, and further including end flanges adapted to overlie the opposite margins of the stake hole;
    retainer means aligned with the openings in the upper and lower plate means for projection above the upper side of the upper plate means; and
    fastener means engaged upon the upper plate means for threadably engaging the lower plate means whereby the upper and lower plate means are tightly urged against the section upper side and underside, respectively, the fastener means comprising a threaded stud threaded through the central opening in the lower plate means and having an upper extremity extending through and upwardly of the opening in the upper plate means and threadably mounting the retainer means.

4. A tie down assembly according to claim 3 wherein the upper plate means is upwardly concave.

5. A tie down assembly for mounting to a vehicle cargo bed side wall having a horizontal section provided with a stake hole, the assembly comprising:
    a lower plate means having an opening and dimensioned for passage through the stake hole and manipulation into engagement with the underside of the side wall section;
    upper plate means for engagement with the upper side of the section and including an opening aligned with the opening in the lower plate means;
    retainer means aligned with the openings in the upper and lower plate means for projection above the upper side of the upper plate means;
    fastener means engaged upon the upper plate means for threadably engaging the lower plate means whereby the upper and lower plate means are tightly urged against the section upper side and underside, respectively;
    arcuate support means having lateral sections for overlying and engaging the upper side of a support frame which is engaged upon the horizontal section of the cargo bed side wall and which has an opening aligned with the retainer means, the support means including a central aperture;
    a hook means for extension into the support frame opening for hooking engagement with the retainer means, the hook means extending upwardly through the aperture in the support means; and
    a tightening means carried at the upper portion of the hook means and operable to urge the support means downwardly.

6. A tie down assembly according to claim 5 wherein the upper extremity of the hook means is threaded, and the tightening means comprises a wing nut threaded onto the upper extremity.

7. A tie down assembly according to claim 6 and including a lock nut threaded onto the upper extremity and operative to tightly bear against the underside of the margins defining the aperture in the support means.

8. A tie down assembly for mounting to a vehicle cargo bed side wall having a horizontal section provided with a stake hole, the assembly comprising:
    a lower plate means having an opening and dimensioned for passage through the stake hole and manipulation into engagement with the underside of the side wall section;
    upper plate means for engagement with the upper side of the section and including an opening aligned with the opening in the lower plate means;

retainer means aligned with the openings in the upper and lower plate means or projection above the upper side of the upper plate means; and fastener means engaged upon the upper plate means for threadably engaging the lower plate means whereby the upper and lower plate means are tightly urged against the section upper side and underside, respectively, the fastener means comprising an elongated member coupled to the lower plate means and extending through the upper plate means, the upper extremity of the member being adapted to further extend through an opening in a support frame engaged upon the horizontal section of the cargo bed side wall, and wherein the retainer means is mounted to the upper extremity of the member and is operative to urge the support frame downwardly.

9. A tie down assembly according to claim 8 wherein the elongated member is threadably coupled to the lower plate means, and the retainer means is threaded onto the upper extremity of the member.

10. A tie down assembly according to claim 9 wherein the retainer means includes a circumferentially continuous portion defining an eye for receiving a cargo line or the like.

* * * * *

UNITED STATES PATENT AND TRADEMARK OFFICE
CERTIFICATE OF CORRECTION

PATENT NO. : 4,948,311
DATED : August 14, 1990
INVENTOR(S) : St. Pierre et al.

It is certified that error appears in the above-identified patent and that said Letters Patent is hereby corrected as shown below:

<u>Title page,</u>
Item [*], the "Notice" should read -- This patent is subject to a Terminal Disclaimer. --

Signed and Sealed this

Twelfth Day of November, 2002

Attest:

Attesting Officer

JAMES E. ROGAN
*Director of the United States Patent and Trademark Office*